(No Model.) 6 Sheets—Sheet 1.

J. W. FLOWER & R. J. COUSINS.
CORKING MACHINE.

No. 588,414. Patented Aug. 17, 1897.

(No Model.) 6 Sheets—Sheet 3.

J. W. FLOWER & R. J. COUSINS.
CORKING MACHINE.

No. 588,414. Patented Aug. 17, 1897.

Witnesses.

Inventors.

(No Model.) 6 Sheets—Sheet 4.

J. W. FLOWER & R. J. COUSINS.
CORKING MACHINE.

No. 588,414. Patented Aug. 17, 1897.

Witnesses.

Inventors.

(No Model.) 6 Sheets—Sheet 5.

J. W. FLOWER & R. J. COUSINS.
CORKING MACHINE.

No. 588,414. Patented Aug. 17, 1897.

Witnesses
Inventors.

(No Model.) 6 Sheets—Sheet 6.

J. W. FLOWER & R. J. COUSINS.
CORKING MACHINE.

No. 588,414. Patented Aug. 17, 1897.

Witnesses.

Inventors.

UNITED STATES PATENT OFFICE.

JOHN WALTER FLOWER AND ROBERT JOHN COUSINS, OF SHAFTESBURY, ENGLAND.

CORKING-MACHINE.

SPECIFICATION forming part of Letters Patent No. 588,414, dated August 17, 1897.

Application filed September 3, 1896. Serial No. 604,784. (No model.) Patented in England June 16, 1893, No. 11,898.

*To all whom it may concern:*

Be it known that we, JOHN WALTER FLOWER and ROBERT JOHN COUSINS, subjects of the Queen of Great Britain, residing at Fontmell Magna, Shaftesbury, England, have invented new and useful Improvements in Corking-Machines, (for part of which we have obtained a patent in Great Britain, No. 11,898, dated June 16, 1893,) of which the following is a specification.

Our invention relates to machines for rapidly and efficiently corking bottles and, if desired, at the same time exhausting the air from the bottle-necks just prior to the introduction of the corks, so as to prevent any deterioration of the liquid in the bottles by reason of the contact of air therewith.

Our improved machine comprises a table or platform upon which the bottles to be corked are placed and which is adapted to be rotated intermittently to bring the several bottles successively into position to receive the corks and several pairs or jaws or clips into which the bottles are placed and which as the table rotates are closed, so as to grip the bottles firmly and center them relatively with the corking-nozzle, which latter is provided with segmental pieces arranged in conjunction with springs in such a manner that the said segmental pieces will yield to accommodate bottles having mouths of different diameters. In connection with the corking-nozzle is a cork-compressor, which is arranged to compress the cork in two directions and also to scrape the bottom of the cork to remove any dust or dirt therefrom, the main part of the compressor being operated positively in both directions by a cam. The corks are fed to the compressor from a hopper having within it a rotating drum or cylinder provided with spirally-arranged ribs or projections which as the drum rotates cause the corks to pass lengthwise into a chute which conducts them into the compression-chamber. In the said chute we arrange what we may term a "cut-off" for allowing only one cork to be released from the chute at a time. This cut-off is operated from the lever working the main cork-compressor. A spring is placed between the cut-off proper and the lever operating the same for preventing the cut-off pressing against the corks with too great pressure. The plunger, by means of which the corks are driven from the compression-chamber into the bottles, is operated by a cam which moves the said plunger positively in both directions, thereby dispensing with the necessity for employing a spring.

The apparatus which we employ for exhausting the air from the bottles prior to the introduction of the cork comprises an air-pump, the piston of which is operated by an eccentric on the driving-shaft of the machine. This cylinder is connected at about the middle of its length with the compression-chamber immediately adjacent to the cork outlet or nozzle, so that when the exhaustion of air has been effected the cork will enter the mouth of the bottle. A cushion is arranged around the cork-outlet for forming a tight joint between the bottle and the compression-chamber.

To enable our invention to be fully understood, we will describe the same by reference to the accompanying drawings, in which—

Fig. 4 is a sectional side elevation of some of the mechanism shown in Fig. 2, drawn to a larger scale. Fig. 8 is a horizontal section of the cork-compressor, drawn to a larger scale than Fig. 7; and Fig. 9 is a section on the line 9 9, Fig. 8. Figs. 14 and 15 are an elevation and vertical section, respectively, of two cams, hereinafter referred to.

$a$ is the frame or standard carrying the working parts of the machine.

$b$ is the first-motion shaft, which receives its motion from any suitable motor and communicates it through the gear-wheels $b'\,b^2$ to a shaft $c$, carrying a crank, cams, and eccentrics by which motion is given to the various parts of the machine in their required order.

$d$ is the table or platform on which the bottles to be corked are placed, the said table being mounted upon the shaft $d'$, the upper end of which is supported in a bearing $d^2$ on the frame $a$, while the lower end is carried by a foot step-bearing at $d^3$ in the upper end of a tube $d^4$. This tube $d^4$ has within it a rod $d^5$, which is suspended from a lever $e$, passing through a slot $d^6$ in one side of the tube $d^4$, the said rod $d^5$ being screw-threaded at its lower end and carrying a hand-wheel and lock-nut $d^7$, the rotation of which in one or the other direction serves to raise or lower the tube $d^4$, and consequently the height of the shaft $d'$ and of the bottle-carrying table $d$. By this arrangement the table can be adjusted for different sizes of bottles. Motion is communicated to the shaft $d'$ and to the table $d$ to intermittently rotate the same from a crank $c'$ on the shaft $c$. (Shown clearly in Figs. 3 and 4.) The pin of this crank works in the slot $f$ of a plate $f'$, fixed to a bar $f^2$, sliding in suitable guides $f^3$ on the frame $a$, and serves to reciprocate the said bar.

On the upper end of the shaft $d'$ is a ratchet-wheel $g$, (shown most clearly in Fig. 5,) having internal ratchet-teeth, the said wheel being connected to the shaft $d'$ by a feather, so that the said shaft can slide through it when the table $d$ is raised or lowered. Loosely mounted upon the said shaft $d'$ above the ratchet-wheel $g$ is the oscillating arm $g'$, having at its outer end a spring pawl or tooth $g^2$, which engages with the teeth of the wheel $g$ in one direction and slips over them in the reverse direction. This arm $g'$ is connected by a link $g^3$ with the reciprocating plate $f'$, so that as the said bar $f^2$ is reciprocated an oscillating movement will be imparted to the arm $g'$ to produce the intermittent rotation desired. To lock the ratchet-wheel in position as each bottle is brought beneath the corking-nozzle, we arrange the detent $h$, having a pin $h'$, Fig. 6, designed to enter corresponding holes $h^2\,h^2$, Fig. 5, in the ratchet-wheel $g$, the said detent-lever having an arm $h^3$, designed to be acted upon by the head of the crank $c'$ during the rotation of the latter to disengage the pin $h'$ from the hole $h^2$, which it occupies. This detent-lever also carries a spring $h^4$, (indicated by the dotted lines in Fig. 6,) which spring, by being impinged against by a roller or abutment $h^5$ on the plate $f'$, serves to press the pin $h'$ into the hole beneath it in case the said pin tends to stick in entering the said hole. A cushion $h^6$, of elastic material, is placed beneath the end of the detent-lever $h$ to prevent undue noise when the said pin $h'$ enters a hole $h^2$ under the action of the spring $h^4$.

Figure 5:
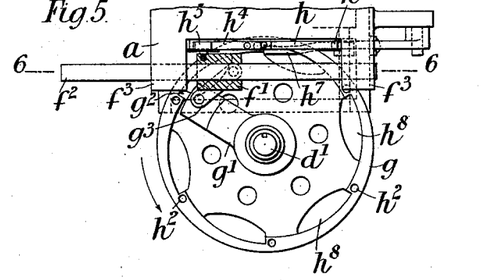
Fig. 5 is a sectional plan view of the mechanism for intermittently rotating the bottle-carrying table.
Figure 6:
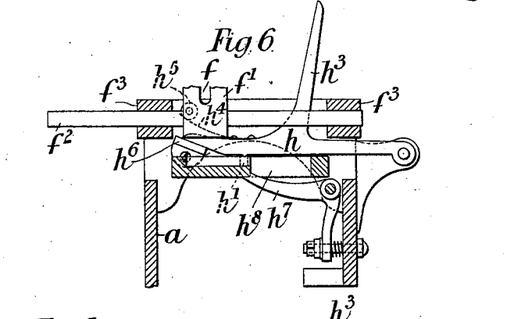
Fig. 6 is a vertical section on the line 6 6 of Fig. 5.

To prevent the friction of the pawl $g^2$ against the inner face of the wheel $g$ from rotating the said wheel in a backward direction, we arrange underneath the said wheel $g$ a spring-pawl $h^7$, which engages with the teeth of the ratchet-wheel through openings $h^8$, Fig. 5, formed in the said wheel.

Figure 2:
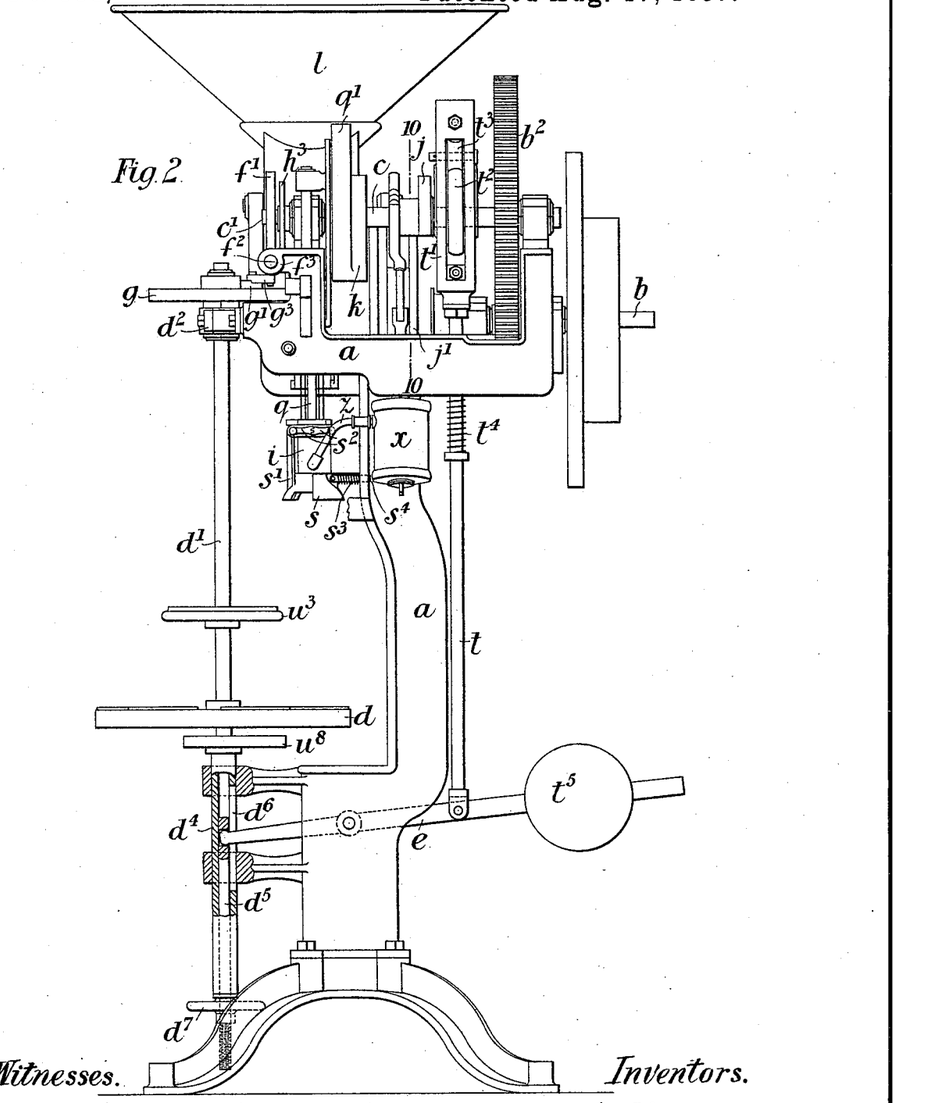
Fig. 2 is a sectional side elevation of the same, the bottle-gripping mechanism being removed.
Figures 3, 11, 18:
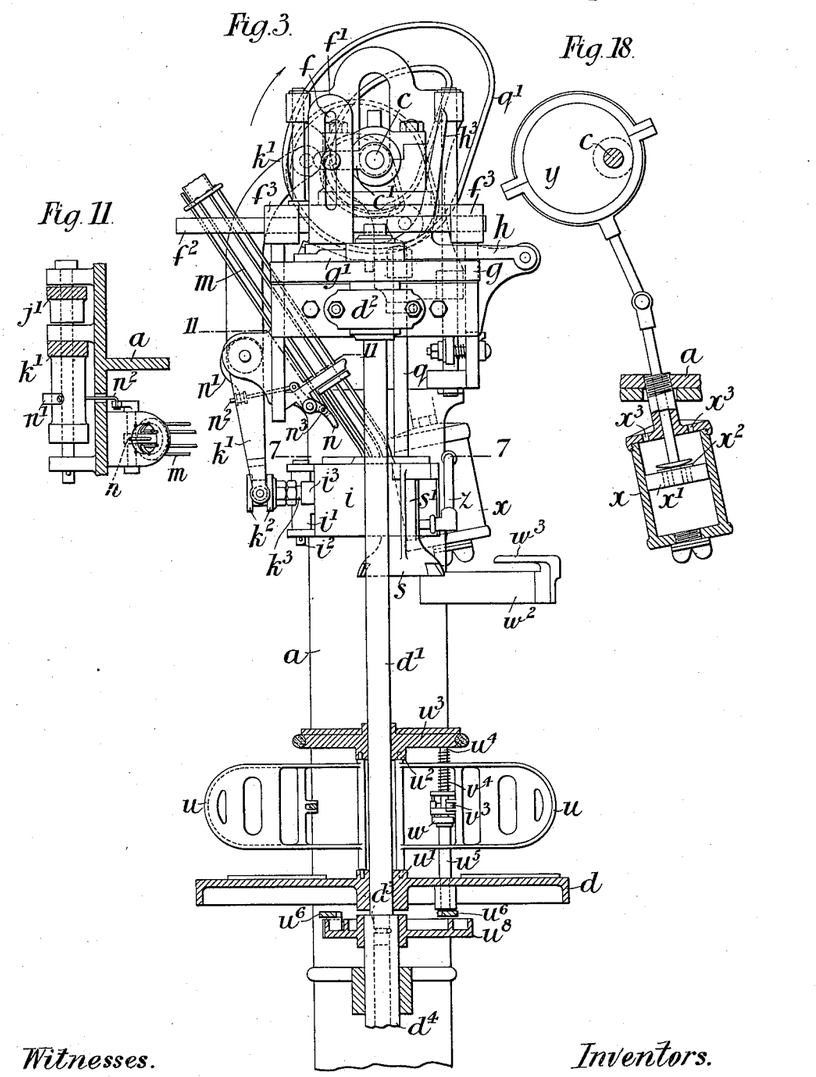
Fig. 3 is a front sectional elevation of some of the mechanism shown in Fig. 1, drawn to a larger scale.
Fig. 11 is a section on the line 11 11, Fig. 3.
Fig. 18 is a detached sectional view showing the arrangement of pump for exhausting air from the bottles prior to the introduction of the corks.
Figures 4, 8, 9, 14, 15:
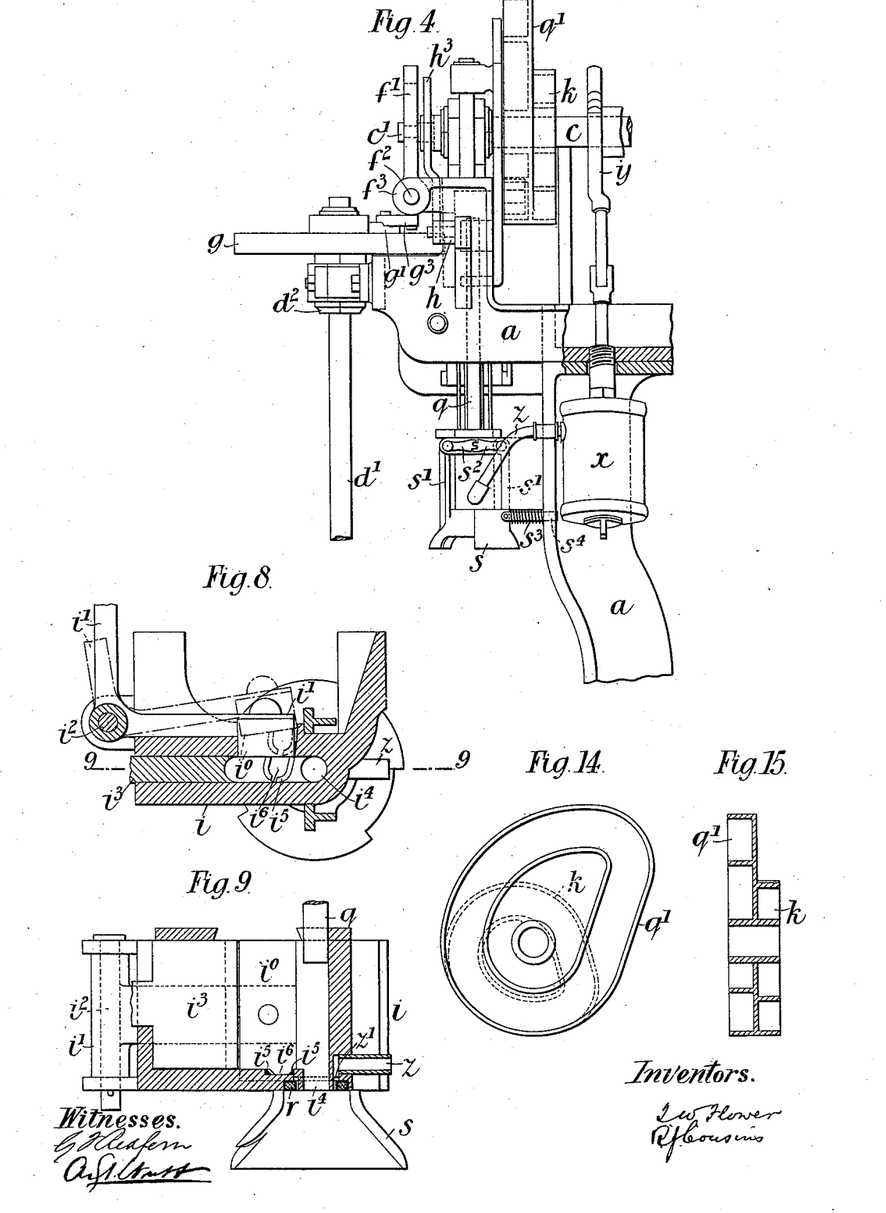

$i$, Figs. 1, 2, 3, and 7, is the chamber in which the corks are compressed, the said chamber being provided with a side compressor $i^0$, carried by a bell-cranked lever $i'$, pivoted at $i^2$, and with a main compressor $i^3$, which is reciprocated to and fro in the said chamber, as will be understood by reference to Figs. 8 and 9. When the cork enters the chamber $i$, it is first of all acted upon by the side compressor $i^0$ and compressed into a flattened elliptical form and then by the main compressor $i^3$, which pushes the partially-compressed cork over the hole $i^4$, through which the cork is forced, and finally presses it to the desired extent in a direction at right angles to that in which it was compressed by the side compressor. Attached to the side compressor is a scraper $i^5$, which as the said side compressor is moved inward to compress the cork enters a recess $i^6$, Fig. 9, in the bottom of the compressor-chamber, so that as the cork is pushed forward by the main compressor its lower end rubs against the said scraper, whereby any foreign matter is removed, which foreign matter is drawn out by the said scraper, which is hollow, when the side compressor moves outward.

Figures 1, 10, 12, 13:
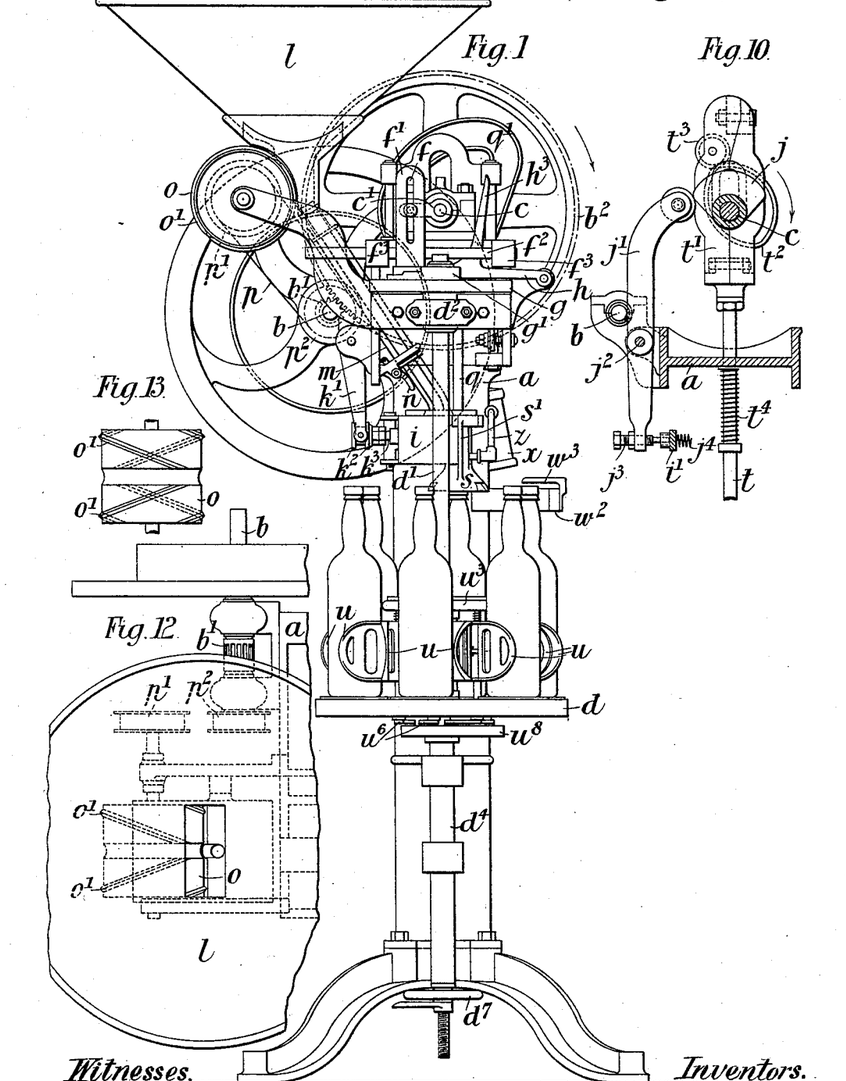
Figure 1 is a front elevation of a machine having our improvements applied thereto.
Fig. 10 is a section on the line 10 10, Fig. 2, illustrating details in connection with the operation of the compressor and the bottle-carrying table.
Fig. 12 is a plan showing the cork-feeding mechanism.
Fig. 13 is a view of a detail of the cork-feeding mechanism.
Figure 7:
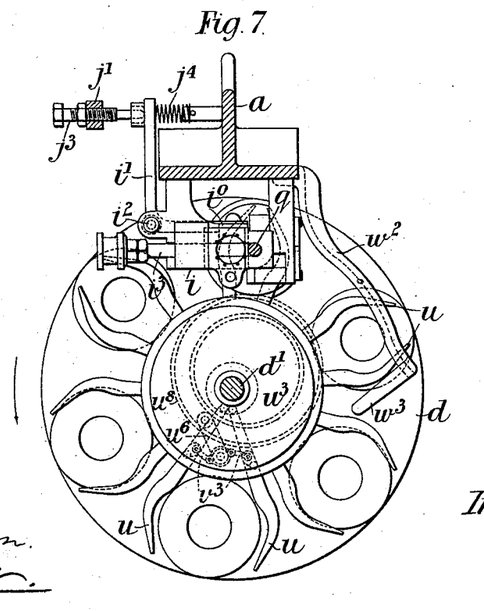
Fig. 7 is a horizontal section on the line 7 7 of Fig. 3.

Movement is imparted to the side compressor from the second-motion shaft $c$, through the medium of a cam $j$, Figs. 2 and 10, which acts against one end of a lever $j'$, pivoted at $j^2$ on the frame $a$, and with its other end bearing against the bell-crank lever $i'$, Figs. 7 and 10.

While the cork is being introduced into the compression-chamber the side compressor occupies the position indicated by dotted lines in Fig. 8. When, however, the cam $j$ acts against the lever $j'$, the said side compressor is moved to the position shown in the full lines in the said Fig. 8. The end of the lever $j'$, which bears against the bell-crank lever $i'$, is provided with a screw $j^3$ for accurately adjusting the relative positions of the said levers $i'$ $j'$. After the lever $j'$ has been moved in one direction by the cam $j$ it is moved in the reverse direction by a spring $j^4$.

The reciprocating motion of the main compressor $i^3$ is produced by a cam $k$, Figs. 4, 14, and 15, on the second-motion shaft, the said cam being grooved and operating upon a roller carried at one end of a lever $k'$, the other end of which is bifurcated and engages between two collars $k^2\ k^2$ on a rod $k^3$, connected with the main compressor $i^3$, as shown in Figs. 1 and 3.

It will be understood that the relative positions of the cams operating the side and the main compressors are such that the side compressor is first operated and then the main compressor.

$l$, Figs. 1, 2, and 12, is the cork-hopper, and $m$ is the chute for conducting the corks from the hopper to the compression-chamber, the said chute being preferably formed of a number of wires, in order that access may be readily obtained to the interior of the same in case the corks jam therein. The lower part of the chute $m$ is made removable, as shown in Fig. 3, to allow of access to the chamber $i$, if required.

$n$ is the cut-off which we employ for preventing more than one cork from entering the compression-chamber at a time. This cut-off is in the form of a pivoted lever which is connected with a spring $n'$, fixed to the boss of the main-compressor-operating lever $k'$ by a rod $n^2$, Figs. 3 and 11. With this arrangement when the main compressor $i^3$ is pushed in to compress a cork the cut-off lever $n$ is moved out of the chute to let another cork drop, while directly the main compressor is drawn back the cut-off finger enters the chute and retains the corks therein, the spring $n'$ allowing of the cut-off lever coming to rest slightly sooner than the lever $k'$.

To facilitate the sliding of the corks down the chute, we have in Fig. 3 represented the cut-off lever $n$ as having attached to it at $n^8$ one of the wires which forms the cork-chute, whereby each time that the cut-off lever is moved the said wire will also be caused to slide longitudinally.

To cause the corks in the hopper to gravitate toward the chute, we arrange at the lower part of the hopper, immediately adjacent to the entrance of the chute, the roller or drum $o$, Figs. 1, 12, and 13, having on it the spiral ribs $o'$, which as the roller is rotated from any suitable part of the machine—for instance, by the belt $p$ and pulley $p'$ from the pulley $p^2$ on the first-motion shaft—direct the corks lengthwise and one at a time into the chute $m$.

$q$, Figs. 1, 3, 4, and 9, is the plunger by means of which the corks are driven from the compression-chamber through the opening $i^4$ therein into the bottle. This plunger slides through a suitable opening in the top of the compression-chamber $i$ and is positively operated in both directions by a grooved cam $q'$ on the second-motion shaft $c$, which cam is preferably formed in one piece with the cam $k$, as shown in Figs. 14 and 15.

The opening or nozzle $i^4$, Figs. 8 and 9, through which the corks are driven from the compression-chamber $i$, has arranged in conjunction with it an elastic seating or pad $r$, against which the bottle-mouths are pressed by the upward movement of the table $d$, and adjacent to this seating is a divided guide $s$ in the form of an inverted cup, the two parts of which are attached to arms $s'\ s'$, depending from the compression-chamber, as shown most clearly in Fig. 4, the said arms being geared together by means of the toothed levers $s^2\ s^2$, so that they will move in unison. A spring $s^3$, arranged around a rod $s^4$, connected to one of the halves and projecting through a hole in the frame $a$, serves for normally holding the two parts of the inverted cup in contact.

It will be understood that as the table is lifted to bring a bottle into contact with the ring $r$ the inclined sides of the inverted cone or cup will serve to center the mouth of the bottle relatively with the said packing-ring and, if necessary, slightly separate in order to permit of the mouth going close up to the ring.

The periodical raising and lowering of the table to bring the bottles close to the opening $i^4$ of the compression-chamber $i$ is effected by connecting the lever $e$, hereinbefore described, to a rod $t$, the upper end of which carries a slotted head $t'$, Figs. 2 and 10, which embraces a cam $t^2$ on the second-motion shaft $c$ and has mounted in it a roller $t^3$, against which the said cam works, a spring $t^4$ on the rod $t$ and a weight $t^5$ on the lever $e$ serving to counterbalance the weight of the table and the bottles upon it.

$u\ u$, Figs. 1, 3, and 7, are the pairs of spring jaws or clips designed to hold the bottles in position on the table while being corked and to center them relatively with the cork-nozzle. In the drawings six pairs of jaws are used, although any other desirable number of pairs may be employed. As the construction of each pair of jaws is identical, we shall only describe one pair. Each jaw $u$ is pivoted at its rear end between the boss $u'$ at the center of the table $d$ and a boss $u^2$ on a disk $u^3$, fixed to the shaft $d'$, as clearly shown in Fig. 3. Between the jaws of each pair is a divided shaft, the two parts of which are indicated by the letters $u^4\ u^5$, Fig. 17, the former of which is rigidly fixed to the disk $u^3$, while the latter is at its upper end made tubular to receive the lower end of the part $u^4$ and at its lower end, which projects through the table $d$, provided with an arm or lever $u^6$, carrying a roller which runs in the groove $u^7$ of an eccentric cam $u^8$, Figs. 3, 7, and 16.

Figure 16:
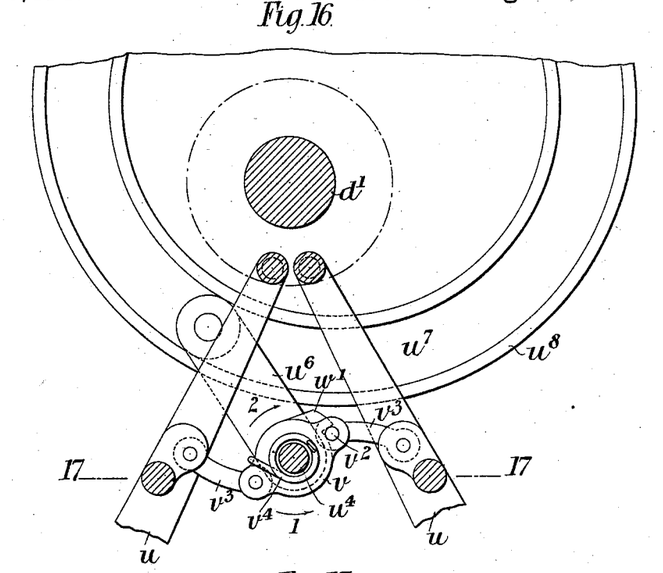
Fig. 16 is a sectional plan showing means for operating the bottle-clips on the table, the said figure being drawn to a larger scale than Fig. 7.
Figure 17:
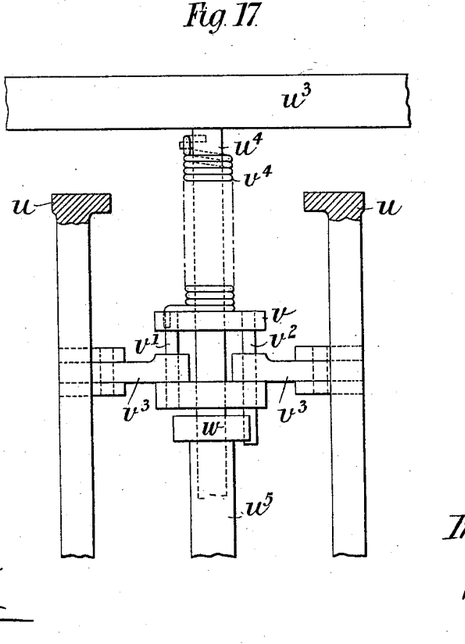
Fig. 17 is a vertical section on the line 17 17 of Fig. 16.

On the spindle $u^4$ is loosely mounted a plate $v$, having two pins $v'\ v^2$ fixed to it, which are in turn connected by links $v^3\ v^3$ with the jaws $u\ u$ in such a manner that when the plate $v$ is turned in the direction of the arrow 1, Fig. 16, the said jaws will be moved toward each other, while when it is turned in the reverse direction they will be separated. Around the spindle $u^4$ is placed a helical spring $v^4$, one end being fixed to the spindle, while the other is fixed to the plate $v$, as will be clearly seen in Fig. 17, the said spring being so coiled that its normal tendency will be to move the plate $v$ in the direction of the arrow 1, Fig. 16, to close the jaws.

On the upper end of the spindle part $u^5$ is fixed a plate $w$, having upon it a tooth $w'$, Fig. 16, against which the pin $v^2$ on the plate $v$ is pressed by the spring $v^4$. It will be obvious that when the lever $u^6$ is moved in the direction of the arrow 2, Fig. 16, the plate $v$ will be moved against the pressure of the spring $v^4$ to separate the jaws $u$ $u$.

The eccentric cam $u^8$ is arranged relatively with the table, as indicated by the dotted lines in Fig. 7, whereby when the jaws $u$ $u$ are beneath the chamber $i$ they will have free liberty, under the action of the spring $v^4$, to grip the bottle in the desired manner and that as the table rotates the lever $u^6$ will be gradually moved by the cam-groove $u^7$ to open the jaws against the pressure of the spring $v^4$ to permit of introducing and removing the bottles. This arrangement of closing the jaws with a spring action has the advantage that the jaws are at all times free to accommodate themselves to the inequalities of the bottles which they grip, the positive movement of the jaws under the action of the cam only being used to open the jaws.

$w^2$, Figs. 1, 3, and 7, is an arm projecting from the standard $a$, the outer end $w^3$ of which arm is turned inwardly, so as to extend over the mouths of the bottles as they pass to the guides $s$, and is arranged at such a height that if any bottle is placed upon the table which is higher than the bottles for which the table has been adjusted it will, by striking against the said end $w^3$, be forced out of the clips $u$ embracing it.

$x$ is the pump-cylinder, and $x'$ the piston therein, by means of which the vacuum is produced in the bottles, the said piston being operated from an eccentric $y$ on the second-motion shaft $c$, as shown in Figs. 2, 4, and 18. The cylinder $x$ is connected by a pipe $z$, Figs. 3, 4, 8, and 9, with an annular space $z'$ around the outside of the nozzle $i^4$, through which the corks are driven, and between the said nozzle and the packing-ring $r$, which latter, in order that the pressure of the bottles against it shall not expand it to close the said space, is preferably confined in a metallic casing, as shown in Fig. 9.

The cylinder $x$ is completely closed at one end in such a manner that as the piston $x'$ is raised in the cylinder the air beneath the piston is rarefied, so that when the piston passes the opening of the pipe $z$ air will be drawn through the said pipe and through the space $z'$. $x^2$ is the valve for allowing the passage of air through the piston on the descent of the same, and $x^3$ $x^3$ are openings for allowing the escape of air from above the piston as the latter rises, or the valve can be placed in the stopper or plug at the bottom of the cylinder.

It will be understood that the eccentric $y$ is so fixed upon the shaft $c$ relatively with the cams which operate the cork-compressors and the plunger $q$ that when a bottle is in position the air is only withdrawn from the same just at the moment that the said plunger is forcing the cork through the nozzle $i^4$.

The general operation of the machine is as follows: The bottles which have been previously filled are placed upon the table between the wide-open jaws $u$ $u$, which table at each revolution of the second-motion shaft is moved around one-sixth of a revolution, corresponding to the distance between two bottles, so that the bottles are successively brought with their mouths immediately beneath the corking-nozzle. As each bottle is brought to this position the table is raised by the cam $t^2$ to press the bottle-mouth against the packing-ring $r$, whereupon the cork which has been previously compressed and forced beneath the plunger is forced through the nozzle $i^4$ into the bottle-neck, the air to be exhausted from the bottle being drawn through the space $z'$ just prior to the forcing of the cork through the said nozzle, as hereinbefore described.

Having now particularly described and ascertained the nature of our said invention and in what manner the same is to be performed, we declare that what we claim is—

1. In a machine for corking bottles the combination of a chamber in which the corks are compressed, means for giving a double compression to the corks and a scraper attached to one of the compressors and designed to remove any dirt from the bottom of the cork and to discharge it outside the compression-chamber, substantially as described.

2. In a corking-machine, the combination with a support for a bottle, of a corking device provided with a cork-chamber, means for feeding a cork to the said chamber, a laterally-movable compressor for said chamber provided with a scraper, adapted to engage the lower end of the cork, the main compressor movable in a line perpendicular to the line of movement of said lateral compressor and the plunger, substantially as described.

3. In a corking-machine the combination with a support for a bottle, of a cork-chamber provided with a corking-aperture at one end, in line with the bottle-mouth, and a recess in its bottom, of the lateral compressor adapted to compress the cork between it and a wall of said chamber, provided with the scraper adapted to engage said recess, the main compressor located in said chamber and movable perpendicularly to the line of movement of said lateral chamber and the plunger in line with said corking-aperture, substantially as described.

4. In a corking-machine the combination with the cork-inserting mechanism including a part for engaging the bottle-mouth having an aperture therein and a plunger above said aperture, of a guide for the bottle-mouth consisting of laterally-yielding sections surrounding said aperture provided with inclined inner faces, substantially as described.

5. In a corking-machine the combination with the cork-inserting mechanism, including a part for engaging the bottle-mouth having an aperture therein and a plunger above said aperture, of a guide for the bottle-mouth consisting of pivoted sections provided with inclined inner faces surrounding said aperture, connected together for joint movement and a spring for holding said sections normally together whereby said sections will yield simultaneously to permit the insertion of the bottle-mouth, substantially as described.

6. In a corking-machine the combination with the cork-inserting mechanism, of a revoluble table provided with means for supporting the bases of a series of bottles, clamping devices for the bottles, means for automatically throwing said clamping devices into and out of engagement with the bottles, means for rotating said table, and means for elevating the said table to bring the mouths of the bottles successively into engagement with the corking mechanism, said table forming the support for the bottles while the corks are inserted, substantially as described.

7. In a corking-machine the combination with the cork-inserting mechanism, of a supporting revoluble table adapted to support a series of bottles, a series of pairs of clamping-wings pivotally connected with said table, an operating-arm for opening and closing each pair of wings, and a stationary cam operatively engaging all of the operating-arms, and means for revolving said table, substantially as described.

8. In a corking-machine, the combination with cork-inserting mechanism, of the feeding-hopper, connected therewith and a feeding-roller having a central annular groove and spiral webs on either side converging toward said groove, substantially as described.

9. In a machine for corking bottles the combination with a cork-conducting chute made of wires, of a cut-off device projecting between the wires and connected to one of them in such a manner that as the cut-off device is operated the wire connected thereto is also moved substantially as described for the purpose specified.

10. In a machine for corking bottles, the combination with an intermittently-rotating table on which the bottles to be corked are placed, of a flexible pad or ring against which the bottles are pressed and a spring-divided guide for insuring the mouths of the bottles being properly positioned relatively with the corking-nozzle and the said pad or packing-ring, substantially as described.

JOHN WALTER FLOWER.
ROBERT JOHN COUSINS.

Witnesses:
G. F. REDFERN,
A. ALBUTT.